(12) United States Patent
Cleland et al.

(10) Patent No.: US 12,551,260 B2
(45) Date of Patent: Feb. 17, 2026

(54) DEVICES, SYSTEMS, AND METHODS FOR ENERGY-BASED TREATMENT OF SYNOVIAL JOINTS AND OTHER FLUID-FILLED SPACES

(71) Applicant: Medtronic, Inc., Minneapolis, MN (US)

(72) Inventors: Andrew J. Cleland, St. Paul, MN (US); Kyle W. Dahlstrom, Eden Prairie, MN (US); Martin G. Hieb, St. Louis Park, MN (US); Darrell J. Swenson, Lino Lakes, MN (US); Yanzhu Zhao, Blaine, MN (US)

(73) Assignee: Medtronic, Inc., Minneapolis, MN (US)

( * ) Notice: Subject to any disclaimer, the term of this patent is extended or adjusted under 35 U.S.C. 154(b) by 892 days.

(21) Appl. No.: 17/687,477

(22) Filed: Mar. 4, 2022

(65) Prior Publication Data
US 2022/0361938 A1 Nov. 17, 2022

Related U.S. Application Data

(60) Provisional application No. 63/187,043, filed on May 11, 2021.

(51) Int. Cl.
*A61B 18/12* (2006.01)
*A61B 18/00* (2006.01)

(52) U.S. Cl.
CPC ............ *A61B 18/1206* (2013.01); *A61B 2018/00315* (2013.01); *A61B 2018/00642* (2013.01);
(Continued)

(58) Field of Classification Search
CPC ...... A61B 18/1206; A61B 2018/00315; A61B 2018/00642; A61B 2018/00702;
(Continued)

(56) References Cited

U.S. PATENT DOCUMENTS

| 5,584,863 A | 12/1996 | Rauch et al. |
| 6,235,020 B1 * | 5/2001 | Cheng ............... A61B 18/149 606/41 |

(Continued)

FOREIGN PATENT DOCUMENTS

| CN | 207506630 U | 6/2018 |
| WO | 9604957 A1 | 2/1996 |

*Primary Examiner* — Tigist S Demie
(74) *Attorney, Agent, or Firm* — Carter, DeLuca & Farrel

(57) ABSTRACT

A surgical system includes a surgical generator and at least one energy delivery device. The surgical generator includes at least one energy output stage configured to deliver energy, a controller configured to control the energy output, and sensor circuitry. The energy delivery device(s) is coupled to the surgical generator, configured for insertion into a synovial joint, and configured to supply energy through synovial fluid in the synovial joint. In a sensing mode, the sensor circuitry is configured to sense at least one electrical parameter of the energy and the controller is configured to determine a parameter of the synovial fluid based thereon. The controller is further configured, in a treatment mode, to control the energy based upon the at least one determined parameter of the synovial fluid to treat tissue of the synovial joint.

14 Claims, 9 Drawing Sheets

(52) U.S. Cl.
CPC ............... *A61B 2018/00702* (2013.01); *A61B 2018/00744* (2013.01); *A61B 2018/00767* (2013.01); *A61B 2018/00773* (2013.01); *A61B 2018/00875* (2013.01); *A61B 2018/126* (2013.01); *A61B 2218/002* (2013.01)

(58) Field of Classification Search
CPC ........... A61B 2018/00744; A61B 2018/00767; A61B 2018/00773; A61B 2018/00875; A61B 2018/126; A61B 2218/002
See application file for complete search history.

(56) References Cited

U.S. PATENT DOCUMENTS

| | | | |
|---|---|---|---|
| 7,278,994 B2 | 10/2007 | Goble | |
| 2010/0198212 A1 | 8/2010 | Sluijter et al. | |
| 2011/0288363 A1* | 11/2011 | Morgan | ................. A61B 18/12 604/82 |
| 2020/0185196 A1 | 6/2020 | Ye et al. | |
| 2020/0265309 A1* | 8/2020 | Wham | ................... G16H 20/40 |

\* cited by examiner

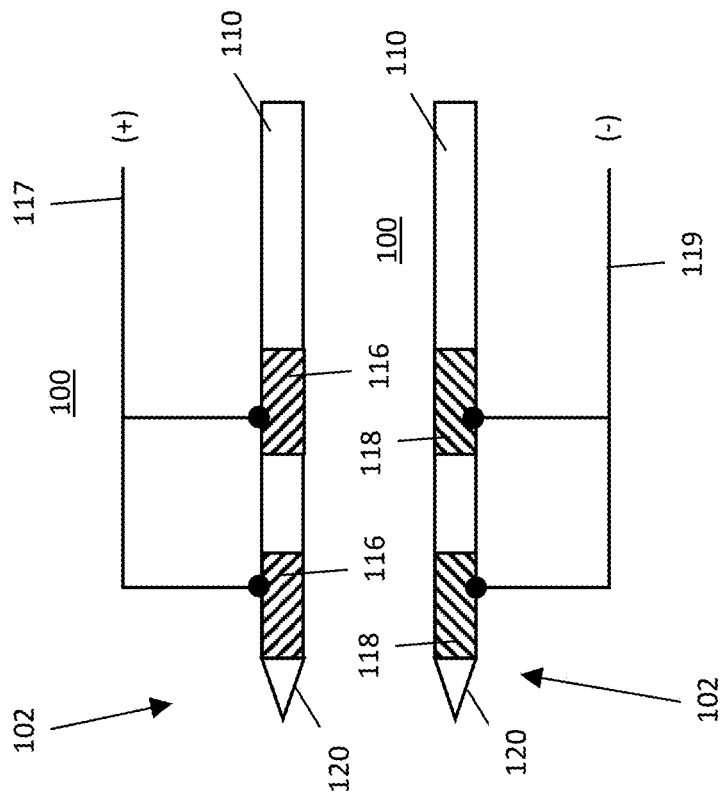
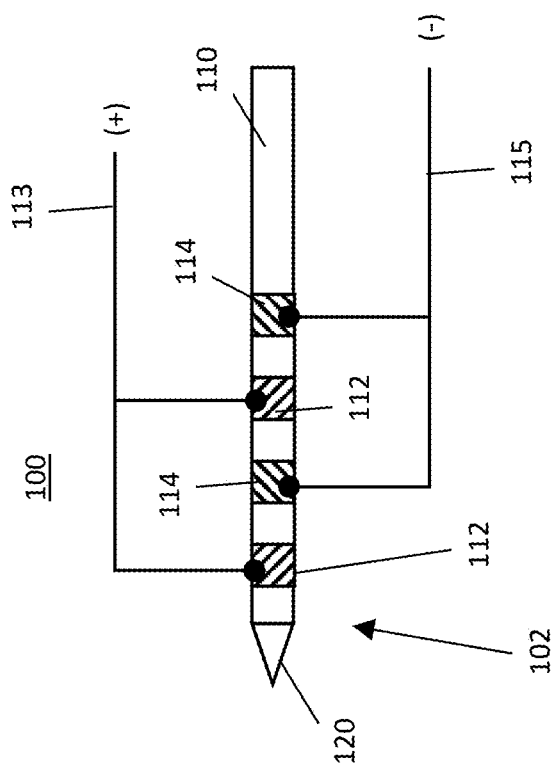
FIG. 2A
FIG. 2B

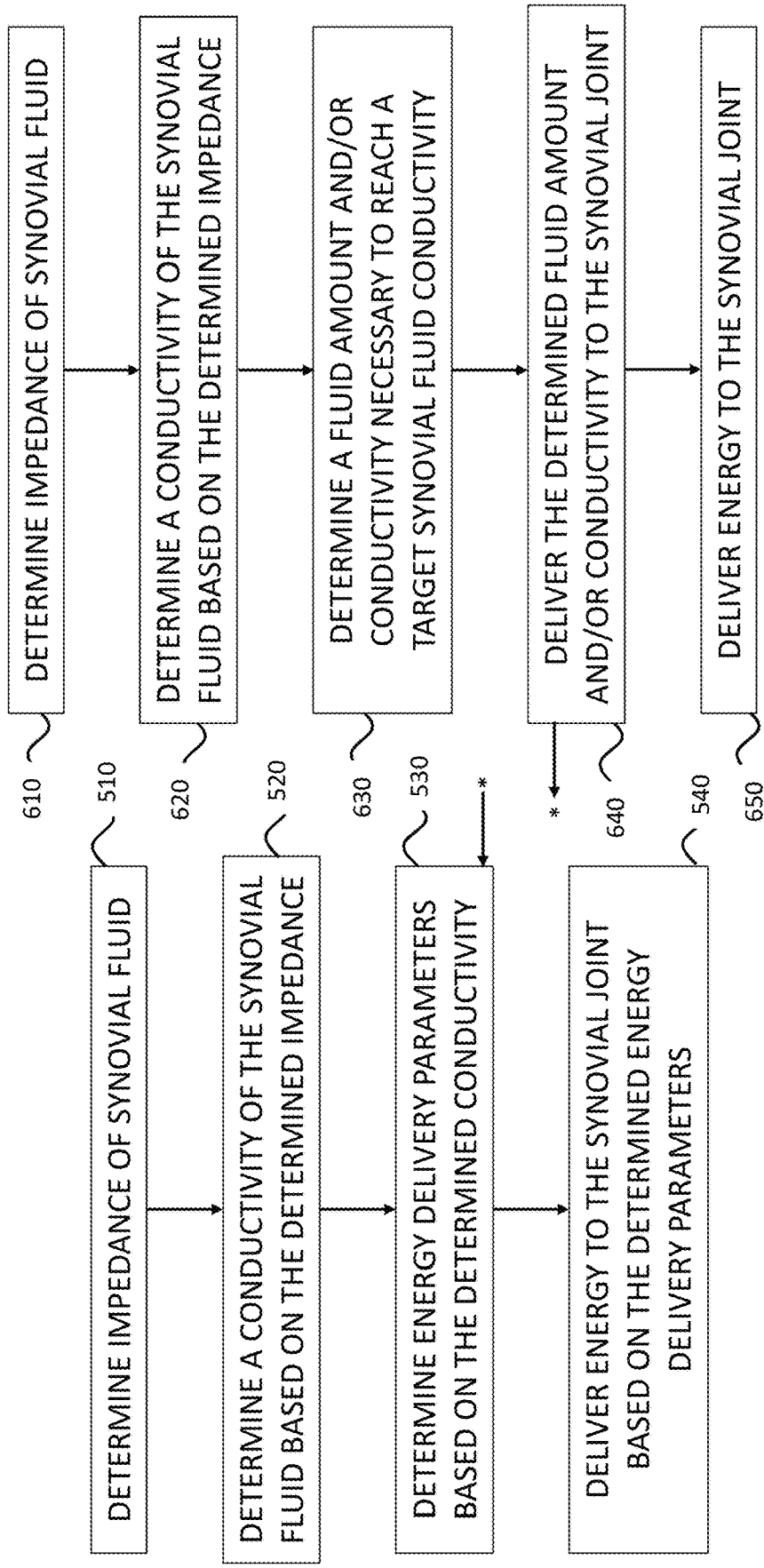

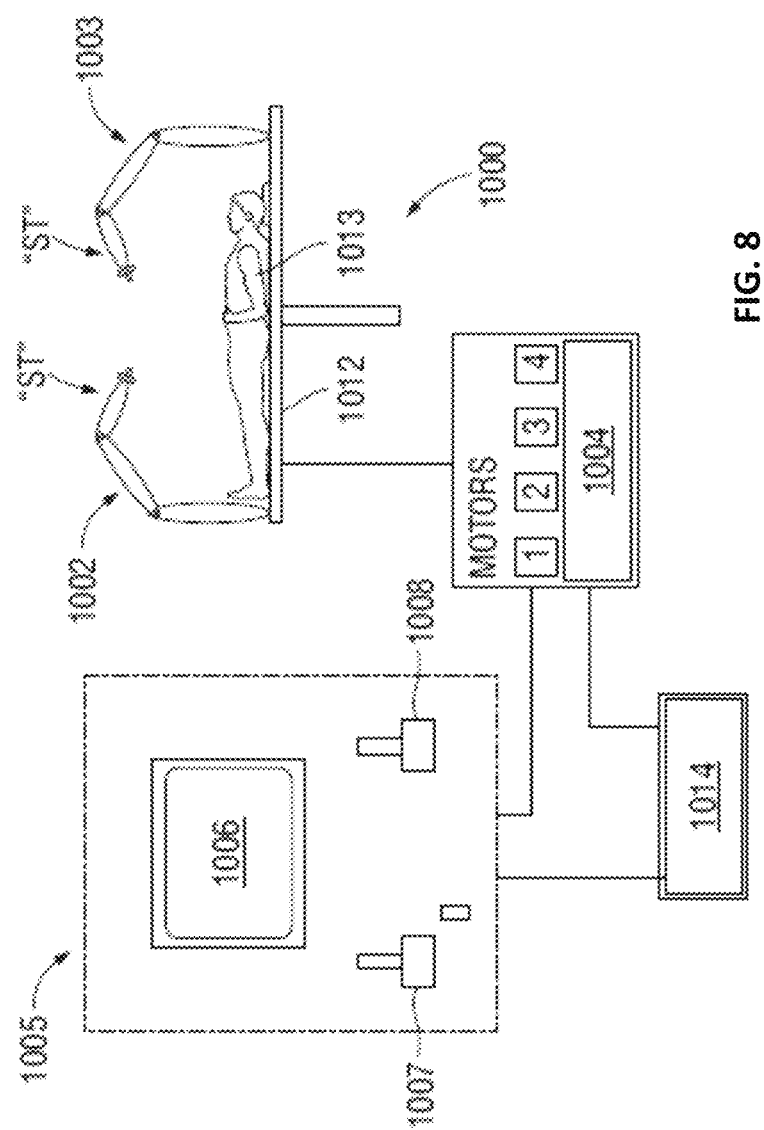

DEVICES, SYSTEMS, AND METHODS FOR ENERGY-BASED TREATMENT OF SYNOVIAL JOINTS AND OTHER FLUID-FILLED SPACES

CROSS-REFERENCE TO RELATED APPLICATIONS

This application claims the benefit of U.S. Provisional Patent Application No. 63/187,043, filed on May 11, 2021, the entire contents of which are hereby incorporated herein by reference.

FIELD

The present disclosure relates generally to energy-based treatment and, more particularly, to devices, systems, and methods for energy-based treatment of synovial joints, e.g., the knee joint, other joints, and/or other fluid-filled spaces.

BACKGROUND

The knee joint, the largest joint in the human body, is formed from the tibiofemoral and patellofemoral joints. The knee joint acts as a hinge to allow flexion and extension between the thigh and lower leg. As a synovial joint, the knee joint is encased in synovial fluid that acts as a lubricator to reduce friction between the articular cartridge of the tibia and femur and of the patella and femur. The knee joint is innervated from branches of the femoral, common peroneal, saphenous, tibial, and obturator nerves.

Chronic knee joint pain may result from arthritic conditions, such as where nerve fibers grow into areas where the cartilage is worn down, from other conditions, and/or from trauma(s). Current treatments for chronic knee pain include drug-based treatments and/or energy-based treatments.

SUMMARY

As used herein, the term "distal" refers to the portion that is being described which is farther from an operator (whether a human surgeon or a surgical robot), while the term "proximal" refers to the portion that is being described which is closer to the operator. Terms including "generally," "about," "substantially," and the like, as utilized herein, are meant to encompass variations, e.g., manufacturing tolerances, material tolerances, use and environmental tolerances, measurement variations, and/or other tolerances and variations. Further, any or all of the aspects described herein, to the extent consistent, may be used in conjunction with any or all of the other aspects described herein.

Provided in accordance with aspects of the present disclosure is a surgical system including a surgical generator and at least one energy delivery device. The surgical generator includes at least one energy output stage configured to deliver energy, at least one controller configured to control the energy output by the at least one energy output stage, and sensor circuitry. The at least one energy delivery device is coupled to the surgical generator, configured for insertion into a synovial joint, and configured to supply energy through synovial fluid in the synovial joint in a sensing mode and a treatment mode. In the sensing mode, the sensor circuitry is configured to sense at least one electrical parameter of the supplied energy and the at least one controller is configured to determine a parameter of the synovial fluid based on the at least one electrical parameter. In the treatment mode, the at least one controller is configured to control the energy output by the at least one energy output stage based upon the at least one determined parameter of the synovial fluid to treat tissue of the synovial joint.

In an aspect of the present disclosure, the at least one determined parameter of the synovial fluid is a conductivity of the synovial fluid. In such aspects, the controller may be configured to determine an impedance of the synovial fluid based on the at least one sensed electrical parameter, whereby the conductivity is determined based upon the impedance.

In another aspect of the present disclosure, in the treatment mode, the at least one energy output stage of the surgical generator and the at least one energy delivery device are configured to supply pulsed bipolar RF energy to the synovial joint.

In aspects of the present disclosure, the at least one energy delivery device includes one energy delivery device having at least one positive electrode and at least one negative electrode. In other aspects of the present disclosure, the at least one energy delivery device includes a first energy delivery device having at least one positive electrode and a second energy delivery device having at least one negative electrode.

In still another aspect of the present disclosure, the controller is configured to control at least one of a power or a voltage of the energy output by the at least one energy stage based upon the at least one determined parameter.

Another surgical system provided in accordance with the present disclosure includes a surgical generator, at least one energy delivery device, and a fluid delivery device. The surgical generator includes at least one energy output stage configured to deliver energy, at least one controller configured to control the energy output by the at least one energy output stage, and sensor circuitry. The at least one energy delivery device is coupled to the surgical generator, configured for insertion into a synovial joint, and configured to supply energy through synovial fluid in the synovial joint in a sensing mode. The fluid delivery device is configured for insertion into the synovial joint and configured to deliver a fluid thereto. In the sensing mode, the sensor circuitry is configured to sense at least one electrical parameter of the supplied energy and the at least one controller is configured to determine a parameter of the synovial fluid based on the at least one electrical parameter. The at least one controller is configured to determine the fluid to be delivered to the synovial joint via the fluid delivery device based upon the determined parameter of the synovial fluid.

In an aspect of the present disclosure, the surgical generator further includes at least one pump configured to pump the determined fluid through the fluid delivery device and into the synovial joint. In such aspects, the surgical generator may be configured to selectively pump fluid from at least two different fluid sources to achieve a fluid mixture to be delivered as the determined fluid.

In another aspect of the present disclosure, the at least one determined parameter of the synovial fluid is a conductivity of the synovial fluid and the determined fluid alters a conductivity of the synovial fluid. In such aspects, the controller may be configured to determine an impedance of the synovial fluid based on the at least one sensed electrical parameter, whereby the conductivity is determined based upon the impedance.

In still another aspect of the present disclosure, in a treatment mode, the at least one energy output stage of the surgical generator and the at least one energy delivery device are configured to supply pulsed bipolar RF energy to the synovial joint to treat tissue of the synovial joint.

In aspects of the present disclosure, the at least one energy delivery device includes one energy delivery device having at least one positive electrode and at least one negative electrode. In other aspects of the present disclosure, the at least one energy delivery device includes a first energy delivery device having at least one positive electrode and a second energy delivery device having at least one negative electrode.

A method of treating a synovial joint in accordance with the present disclosure includes inserting at least one energy delivery device into a synovial joint, supplying energy from the at least one energy delivery to the synovial joint, sensing at least one electrical parameter of the supplied energy, determining a conductivity of synovial fluid in the synovial joint based on the at least one sensed electrical parameter, and one or both of: supplying energy to the synovial joint to treat tissue of the synovial joint based upon the determined conductivity; or supplying fluid to the synovial joint to alter the conductivity of the synovial fluid based upon the determined conductivity.

In an aspect of the present disclosure, bipolar RF energy is supplied to the synovial joint to treat tissue of the synovial joint based upon the determined conductivity by selecting energy parameters based upon the determined conductivity. The energy parameters may include at least one of power or voltage.

In another aspect of the present disclosure, fluid is supplied to the synovial joint to modify the conductivity of the synovial fluid towards a target conductivity.

In yet another aspect of the present disclosure, fluid is first supplied to the synovial joint to alter the conductivity of the synovial fluid based upon the determined conductivity, and wherein energy is subsequently supplied to the synovial joint to treat tissue of the synovial joint based upon the altered conductivity.

BRIEF DESCRIPTION OF DRAWINGS

The above and other aspects and features of the present disclosure will become more apparent in view of the following detailed description when taken in conjunction with the accompanying drawings wherein like reference numerals identify similar or identical elements.

FIG. 2A is a side view of a distal portion of an energy delivery device of the surgical system of FIG. 1 in a bipolar configuration;

FIG. 2B is a side view of distal portions of first and second energy delivery devices of the surgical system of FIG. 1 in a bipolar configuration;

FIG. 5 is a flowchart illustrating a method provided in accordance with the present disclosure;

FIG. 6 is a flowchart illustrating another method provided in accordance with the present disclosure;

FIG. 8 is a schematic illustration of a robotic surgical system configured for use in accordance with the present disclosure.

DETAILED DESCRIPTION

Figure 1:
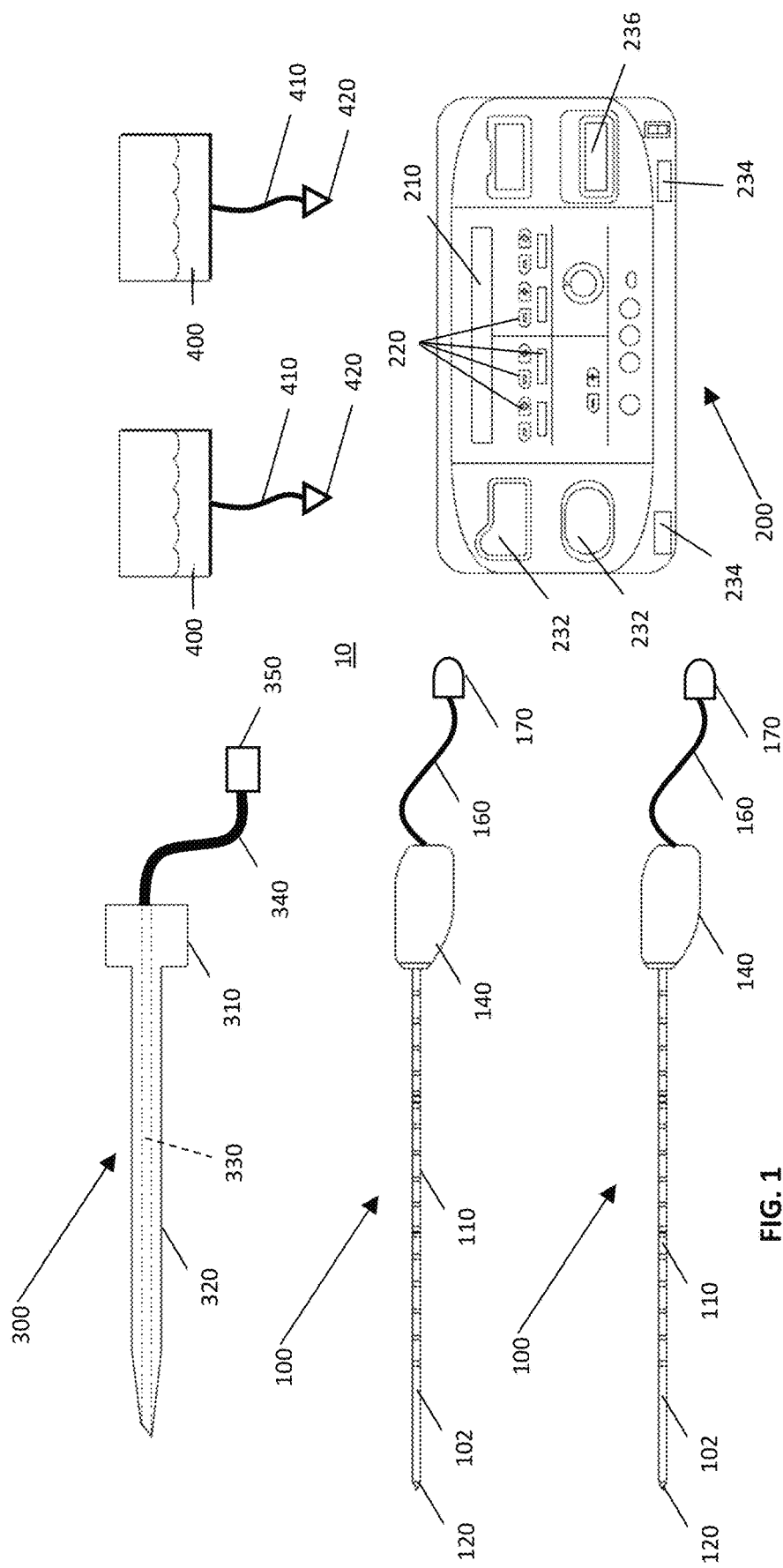
FIG. 1 illustrates a surgical system provided in accordance with the present disclosure including one or more energy delivery devices, a surgical generator, a fluid delivery device, and one or more fluid sources.

FIG. 1 illustrates a surgical system in accordance with the present disclosure shown generally identified by reference numeral 10. Surgical system 10 is configured to facilitate treatment of a surgical site with energy such as, for example, Radio Frequency (RF) energy. Although detailed herein with respect to non-ablative pulsed bipolar RF energy treatment of the knee joint to alleviate chronic pain, the aspects and features of the present disclosure may also be utilized with other types of RF energy (e.g., ablative RF energy, continuous RF energy, monopolar RF energy, etc.), other energy modalities (thermal, microwave, light, ultrasound, etc.), at other anatomical locations (e.g., the shoulder joint, hip joint, intervertebral space, etc.), and/or to treat other conditions (e.g., tumors). Surgical system 10 generally includes one or more energy delivery devices 100, a surgical generator 200 and, in aspects, a fluid delivery device 300 and one or more fluid sources 400. The one or more energy delivery devices 100 are configured to connect to surgical generator 200 to receive RF energy therefrom for delivery to a surgical site. The fluid delivery device 300, in aspects where provided, is configured to facilitate delivery of fluid to the surgical site from the one or more fluid sources 400. In aspects, surgical generator 200 is configured to control the delivery of fluid from the one or more fluid sources 400 through the fluid delivery device 300 and into the surgical site; in other aspects, fluid delivery device 300 and/or the one or more fluid sources 400 are separate form generator 200 and manually or otherwise actuatable to deliver fluid to the surgical site.

Continuing with reference to FIG. 1, each of the at least one energy delivery devices 100 includes a probe 102 and a connection hub 140. In aspects where multiple energy delivery devices 100 are provided, the energy delivery devices 100 may be configured similar to or different from one another. To facilitate understanding, the one or more energy delivery devices 100 may be described hereinbelow in the singular with reference to one energy delivery device 100.

Probe 102 of energy delivery device 100 defines an elongated configuration and may be substantially linear, curved, or otherwise configured to facilitate accessing the surgical site, e.g., the knee joint. In aspects, probe 102 is at least partially formed form a resiliently flexible material, e.g., a shape memory material, to enable resilient flexion of probe 102 to assume as desired trajectory for accessing the surgical site, e.g., the knee joint. In additional or alternative aspects, probe 102 is at least partially formed from a rigid, semi-rigid, malleable, and/or other suitable material(s). Probe 102 includes a body 110 and a distal tip 120. In aspects, an outer insulative jacket (not shown) is disposed about a portion of body 110 such that probe 102 defines a more-proximal insulated portion and a more-distal treating portion. Distal tip 120 may be configured to facilitate penetration into and/or anchoring within tissue including hard tissue, e.g., bone.

Connection hub 140 of energy delivery device 100 supports a proximal end portion of body 110 of probe 102 with probe 102 extending distally from connection hub 140 to distal tip 120. In aspects, connection hub 140 functions as a handle of energy delivery device 100, enabling a user to grasp and manipulate connection hub 140 to thereby manipulate energy delivery device 100. Alternatively, connection hub 140 may be configured to mount on a robotic arm 1002, 1003 of a robotic surgical system 1000 (see FIG. 8) to enable robotic manipulation of energy delivery device 100. A cable 160 extends from connection hub 140 to a plug 170 that is configured to connect to a corresponding port 232 of surgical generator 200 to enable the supply of RF energy from surgical generator 200 to probe 102 of energy delivery device 100.

With additional reference to FIG. 2A, in aspects, energy delivery device 100 may define a bipolar configuration itself wherein body 110 includes one or more positive electrodes 112 and one or more negative electrodes 114, e.g., disposed in alternating fashion or otherwise arranged. In aspects, electrodes 112, 114 are configured as rings disposed about or within body 110. Each electrode 112, 114 may be disposed on, within, or formed as part of body 110. In such aspects, body 110 may be at least partially formed from an electrically-insulative material, at least partially coated with an electrically-insulative material, or otherwise configured to maintain isolation between the positive electrodes 112 and negative electrodes 114. Positive and negative leads 113, 115, are coupled to positive and negative electrodes 112, 114, respectively, and extend from probe 102 through connection hub 140 and cable 160 to plug 170 to enable connection to surgical generator 200 such that bipolar RF energy may be conducted between the positive and negative electrodes 112, 114 and through tissue to treat tissue.

Referring also to FIG. 2B, as an alternative to a configuration wherein a single energy delivery device 100 defines a bipolar configuration, first and second energy delivery devices 100 may cooperate to define a bipolar configuration. In such configurations, a positive lead 117 is coupled to one or more positive electrodes 116 disposed on or in the body 110 of the probe 102 of one of the energy delivery devices 100 while a negative lead 119 is coupled to one or more negative electrodes 118 disposed on or in the body 110 of the probe 102 of the other energy delivery devices 100. Positive and negative leads 117, 119 extend from the respective probes 102 through the respective connection hubs 140 and cables 160 to plugs 170 to enable connection to surgical generator 200 such that bipolar RF energy may be conducted between the positive and negative electrodes 116, 118 of the energy delivery devices 100 and through tissue to treat tissue.

Figure 3:
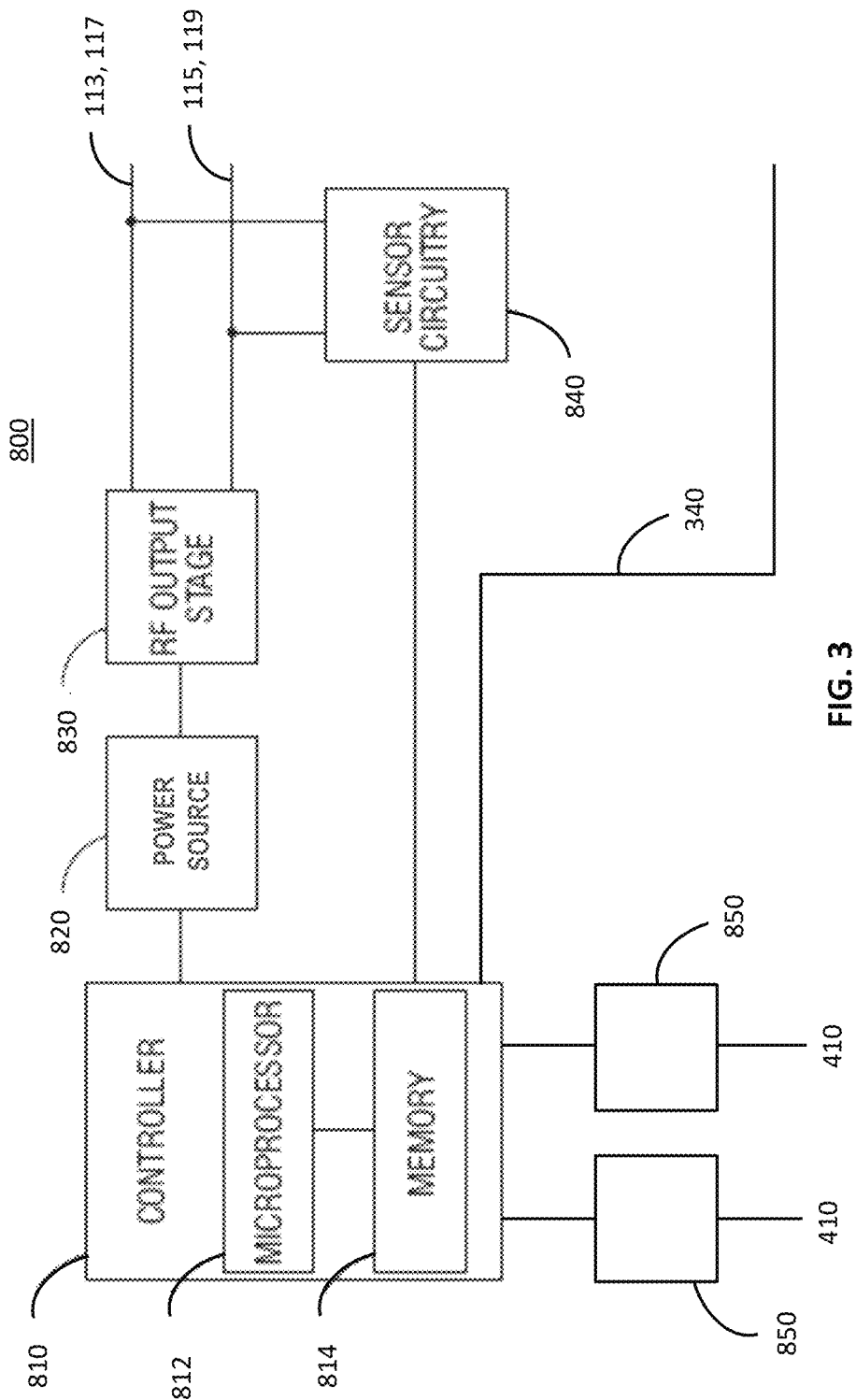
FIG. 3 is a schematic illustration of the surgical generator of the surgical system of FIG. 1.

Turning to FIGS. 1 and 3, generator 200, as noted above, is configured to provide suitable energy to the one or more energy delivery devices 100 for treating tissue therewith. For example, generator 200 may provide pulsed RF energy to the one or more energy delivery devices 100 for treating, e.g., denervating, modulating, etc. nerves within the knee joint, although other suitable types of RF energy and/or tissue treatments are also contemplated. Generator 200 may be configured to vary the power, voltage, current, etc. of the RF energy pulses, and/or may be configured to vary the pulse frequency, pulse width, and/or gap between pulses according to any suitable settings, patterns, graphs, etc.

Generator 200 includes a display 210, a plurality of user interface features 220, e.g., buttons, touch-screen GUIs, switches, etc., one or more energy plug ports 232, one or more fluid inflow plug ports 234, and one or more fluid outflow plug ports 236. Display 210 is configured to display operating parameters, settings, alerts, and/or other information associated with use of the one or more energy delivery devices 100. User interface features 220 enable control of the one or more energy delivery devices 100, e.g., setting adjustment and/or activation of probes 102. The one or more energy plug ports 232 are configured to receive the plugs 170 associated with the cables 160 of the one or more energy delivery devices 100 to couple the same to generator 200. Where additional plug ports 232 are provided, such plug ports 232 may enable connection of auxiliary device(s) and/or other energy-based device(s) to generator 200. The fluid inflow and fluid outflow plug ports 234, 236, respectively, enable the inflow of fluid to and outflow of fluid from generator 200, as detailed below, although in aspects fluid management may be separate from generator 200.

Generator 200 further includes a control system 800 including a controller 810, a power source 820, an RF output stage 830, and sensor circuitry 840. Controller 810 includes a microprocessor 812 and memory 814, e.g., storing instructions to be executed by microprocessor 812 to control the RF energy output by RF output stage 830. More specifically, RF output stage 830, is configured to supply pulses of RF energy to the one or more energy delivery devices 100 via one of electrical lead wires 113, 117 and to receive energy returned from the one or more energy delivery devices 100 via one of electrical lead wires 115, 119, respectively, to complete the circuit back to control system 800.

Sensor circuitry 840 is operably coupled to one of electrical lead wires 113, 117 and one of electrical lead wires 115, 119 so as to enable sensing of electrical parameters of the RF energy delivered to the one or more energy delivery devices 100, e.g., voltage, current, resistance, etc. thereof. Based thereon, controller 810 can determine one or more parameters, e.g., impedance of the synovial fluid. RF output stage 830 may output a sensing energy, e.g., a continuous RF signal or other signal different from the treatment energy, in a sensing mode to facilitate determination of the one or more parameters, e.g., impedance of the synovial fluid. Alternatively or additionally, sensing may occur during a treatment mode, e.g., wherein pulses of RF energy are applied to treat tissue.

In aspects, control system 800 may further include one or more pumps 850 configured to control the amount and/or composition of fluid supplied from the one or more fluid sources 400 through the fluid delivery device 300 and into the surgical site.

Referring back to FIG. 1, fluid delivery device 300 includes a proximal hub 310 and a distal sheath 320 extending distally from proximal hub 310. A longitudinal lumen 330 extends through proximal hub 310 and distal sheath 320 to enable the introduction of fluid therethrough and into the internal surgical site. Distal sheath 320 may include one or more sections that are straight, pre-bent, rigid, flexible, malleable, and/or articulatable.

Fluid delivery device 300 further includes a fluid line 340 fluidly coupled to longitudinal lumen 330 at a distal end thereof and including a fluid connector 350 at a proximal end thereof. Fluid connector 350 is configured to connect to a fluid outflow plug port 236 of generator 200 to enable the pumping of fluid from generator 200 through fluid delivery device 300 and into the internal surgical site. In other aspects, fluid delivery device 300 may be manually filled and/or actuated, e.g., fluid delivery device 300 may be a syringe, or may otherwise operate separately from generator 200 in a manual or at least partially automated manner.

The one or more fluid sources 400 may include, for example, a first fluid source 400 including a non-conductive fluid, e.g., water, and a second fluid source 400 including a conductive fluid, e.g., saline. In aspects, fluid lines 410 and fluid connectors 420 connect the one or more fluid sources 400 to the one or more pumps 850 of control system 800 of generator 200, e.g., via ports 234, to enable generator 200, e.g., controller 810 thereof, to selectively pump a particular quantity of fluid from either or both of the fluid sources 400 (thus achieving a desired fluid amount and/or conductivity) through fluid delivery device 300 and into the internal surgical site. Alternatively, as noted above, fluid sources 400 may be utilized with fluid delivery device 300 separate from generator 200 (manually or at least partially automated).

Figure 4B:
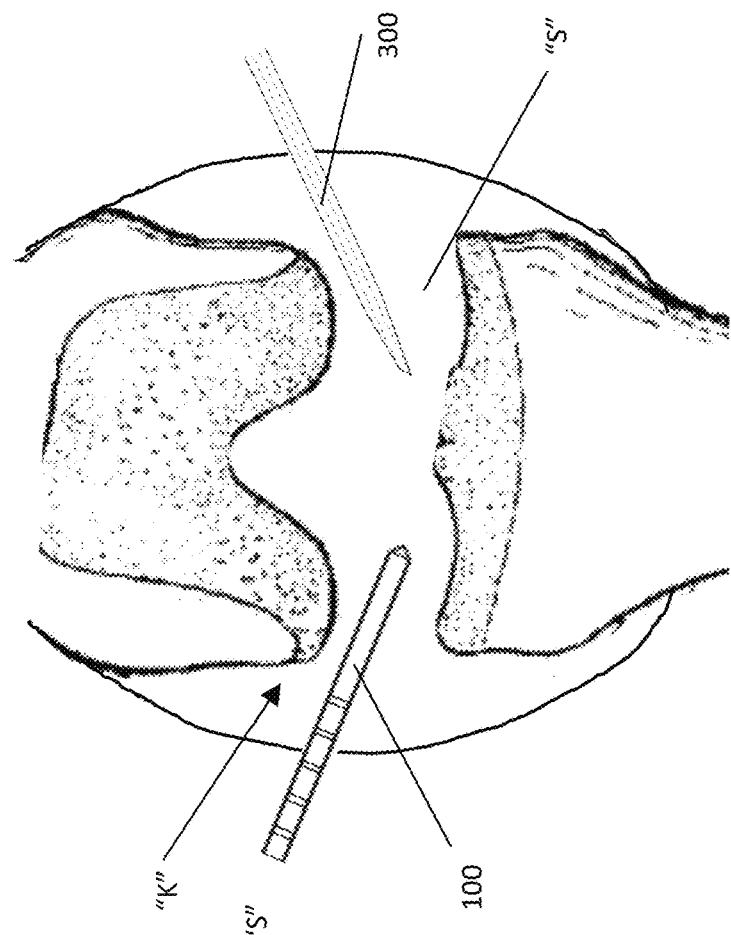
FIG. 4B is a cross-sectional view of a knee joint including an energy delivery device positioned therein and a fluid delivery device positioned therein for delivering fluid to the knee joint.
Figure 4A:
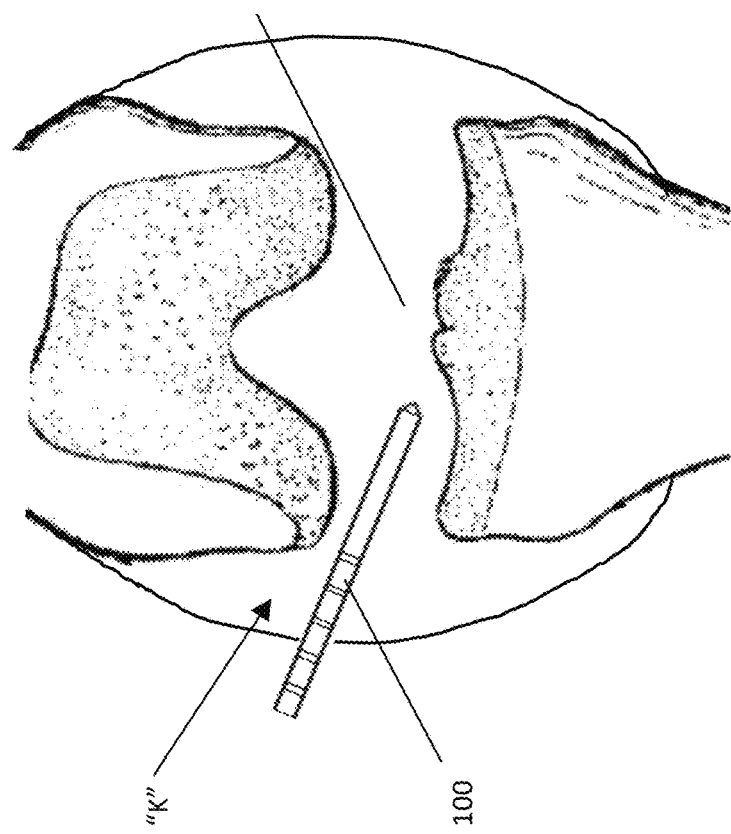
FIG. 4A is a cross-sectional view of a knee joint including an energy delivery device positioned therein for monitoring an impedance of the synovial fluid of the knee joint.
Figure 4C:
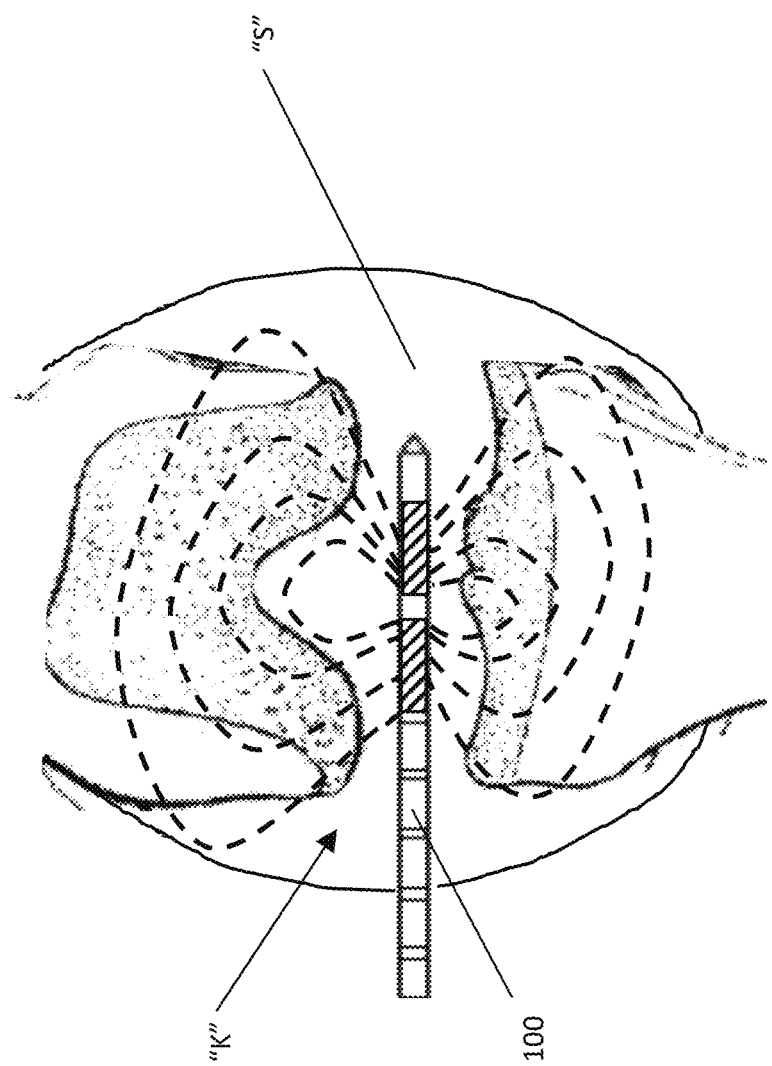
FIG. 4C is a cross-sectional view of a knee joint including an energy delivery device positioned therein for applying energy to the knee joint to treat the knee joint.

Turning to FIGS. 4A, 4C, and 5, the use of system 10 (FIG. 1) to treat a joint, e.g., the knee joint, to alleviate chronic pain is detailed, although the use and method detailed below may also be performed with other suitable surgical systems. Likewise, system 10 (FIG. 1) may be utilized for other purposes and/or at other anatomical locations.

Initially, as shown in FIG. 4A, the one or more energy delivery devices 100 are inserted into the knee joint "K" and energized, e.g., in a sensing mode, to enable generator 200 to determine, as indicated at step 510 of FIG. 5, an impedance of the synovial fluid "S" in the knee joint "K" based on the electrical properties of energy flowing between the electrodes of the one or more energy delivery devices 100 and through the synovial fluid "S." Based on the determined impedance, as indicated at step 520 of FIG. 5, the conductivity of the synovial fluid "S" can be determined, e.g., by generator 200 (FIGS. 1 and 3) according to an algorithm, look-up table, graph, and/or in any other suitable manner. Once the conductivity of the synovial fluid "S" is determined, corresponding energy delivery parameters to facilitate treatment based on the particular conductivity can be determined, as indicated in step 530 of FIG. 5. Determining energy delivery parameters based on the conductivity of the synovial fluid "S" allows for customized treatment based on the physiology of the patient. That is, variations in conductivity vary the ability of energy to travel through the synovial fluid "S" and, thus, vary the extent to which the energy is able to reach tissue structures within the knee joint "K." By taking into account the conductivity, the energy delivery parameters needed to reach the innervated tissue structures within the knee joint "K" to be treated can be selected, without supplying more energy than is necessary (and, thus, reducing the risk of collateral damage). The energy delivery parameters may include, for example, power, voltage, current, ON time, OFF time, and/or properties of the pulses of RF energy, e.g., pulse width, pulse spacing, pulse pattern, etc.

With reference to FIG. 4C, and as indicated in step 540 of FIG. 5, once the energy delivery parameters are determined, energy, e.g., pulsed RF energy in a treatment mode, may be delivered from the one or more energy delivery devices 100, through the synovial fluid "S" (due to the conductivity thereof) to tissue to treat tissue of the knee joint "K" and reduce chronic knee pain without applying more energy than is necessary, which may result in collateral damage.

Turning to FIGS. 4A-4C, and 6, another use of system 10 (FIG. 1) to treat a joint, e.g., the knee joint, to alleviate chronic pain is detailed, although the use and method detailed below may be performed with other suitable surgical systems.

Initially, as shown in FIG. 4A, the one or more energy delivery devices 100 are inserted into the knee joint "K" and energized, e.g., in a sensing mode, to enable generator 200 to determine, as indicated at step 610 of FIG. 6, an impedance of the synovial fluid "S" in the knee joint "K" based on the electrical properties of energy flowing between the electrodes of the one or more energy delivery devices 100 and through the synovial fluid "S." Based on the determined impedance, as indicated at step 620 of FIG. 6, the conductivity of the synovial fluid can be determined, e.g., by generator 200 (FIGS. 1 and 3) according to an algorithm, look-up table, graph, and/or in any other suitable manner. Once the conductivity of the synovial fluid "S" is determined, a fluid amount and/or conductivity needed to reach a target synovial fluid conductivity is determined, as indicated at step 630 in FIG. 6, e.g., by generator 200 (FIGS. 1 and 3) according to an algorithm, look-up table, graph, and/or in any other suitable manner.

In aspects, the conductivity of the synovial fluid and/or the fluid amount and/or conductivity needed to reach a target synovial fluid conductivity may be determined by one or more machine learning algorithms such as, for example, using one or more of: supervised learning, semi-supervised learning, unsupervised learning, reinforcement learning, association rule learning, decision tree learning, anomaly detection, feature learning, etc., and may be modeled as one or more of a neural network, Bayesian network, support vector machine, genetic algorithm, etc. The machine learning algorithm(s) may be trained based on empirical data, for example.

Next, as shown in FIG. 4B, and as indicated at step 640 of FIG. 6, the determined amount and/or conductivity of fluid is delivered to the knee joint "K" to alter the conductivity of the synovial fluid "S," e.g., towards or to the target conductivity. The determined amount and/or conductivity of fluid may be delivered by inserting fluid delivery device 300 into the knee joint "K" and pumping fluid, via the one or more pumps 850 of control system 800 of generator 200 (see FIG. 3), from the one or more fluid sources 400 (FIG. 1) through the fluid delivery device 300 and into the knee joint "K."

Once the fluid has been delivered, the method may proceed to step 530 of FIG. 5, similarly as detailed above. In aspects, steps 510 and 520 of FIG. 5 may first be performed to determine the conductivity of the modified synovial fluid before proceeding to step 530 of FIG. 5. As an alternative to determining energy delivery parameters, the method may proceed to step 650 of FIG. 6, wherein, as shown in FIG. 4C, energy, e.g., pulsed RF energy in a treatment mode, may be delivered from the one or more energy delivery devices 100 to treat the knee joint "K" and reduce chronic knee pain without applying more energy than is necessary (since the synovial fluid "S" has been modified to a corresponding conductivity for the energy delivery parameters to be delivered).

Figure 7A:
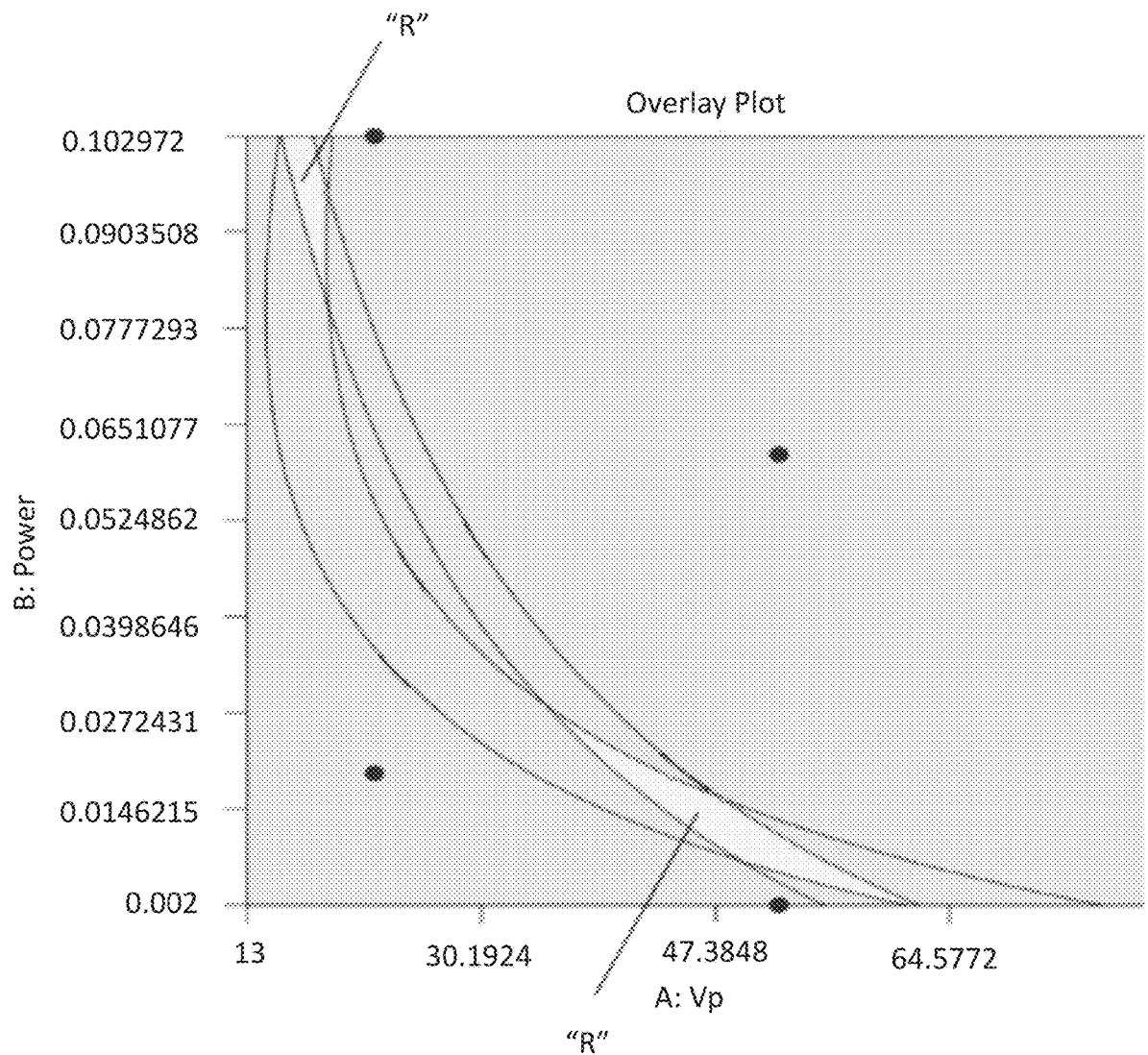
FIGS. 7A and 7B are exemplary graphs illustrating energy delivery parameter curves for different synovial fluid conductivities in accordance with the present disclosure.
Figure 7B:
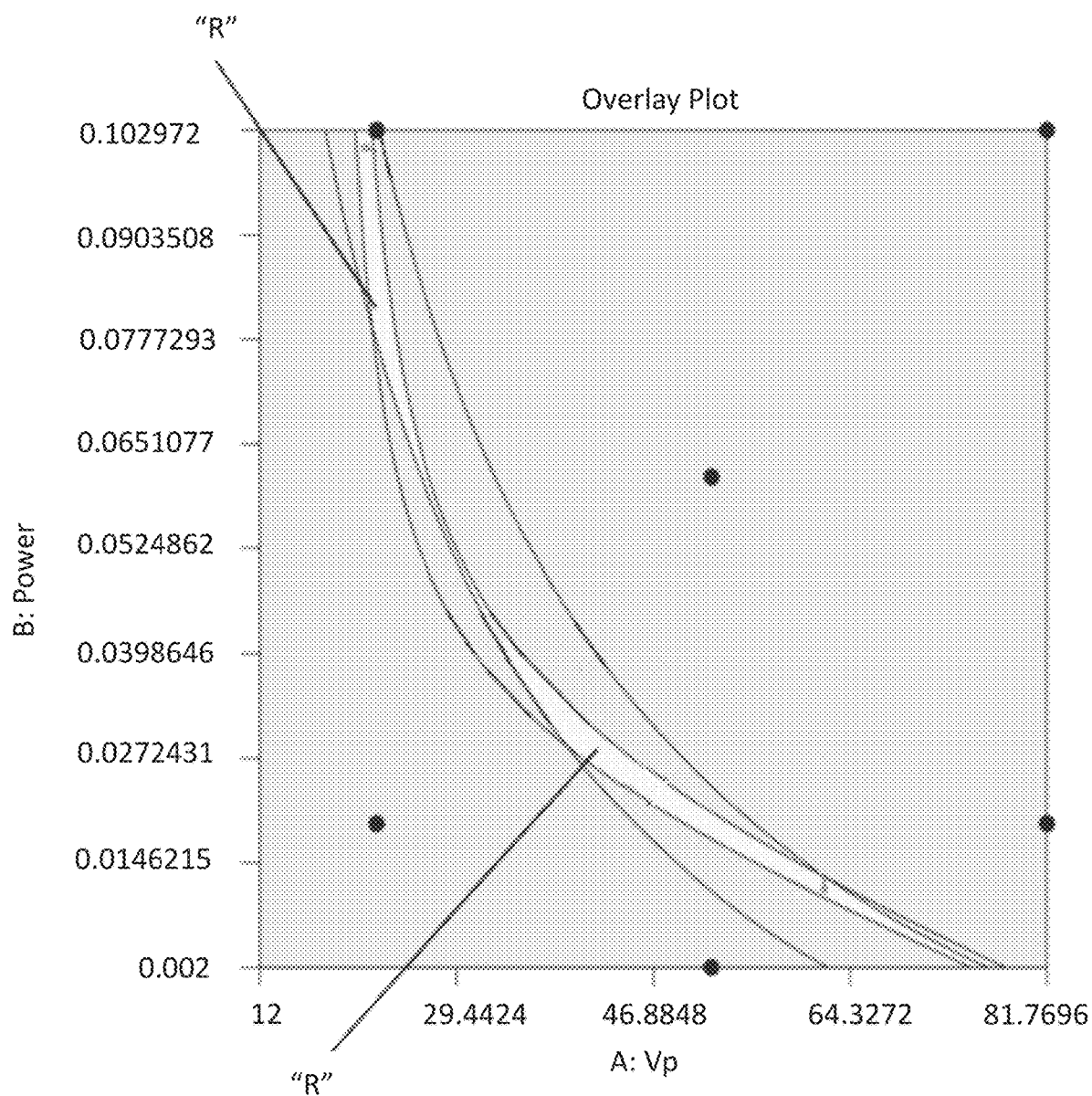

With reference to FIGS. 7A and 7B, exemplary overlay plots are shown wherein energy delivery parameters, e.g., power and voltage, are plotted along curves for different synovial fluid conductivities (wherein a greater conductivity provides the results of FIG. 7A as compared to those of FIG. 7B). The graphs of FIGS. 7A and 7B may define one or more regions "R," from within which the energy delivery parameters, e.g., power and voltage, can be selected to provide suitable tissue treatment and inhibit over-application of energy based on the synovial fluid conductivity. It is noted that the graphs of FIGS. 7A and 7B are exemplary and for the purpose of illustrating how the appropriate energy delivery parameters may change depending upon the synovial fluid conductivity; these graphs are not intended to represent any actual energy delivery parameter valves or relationships therebetween. In aspects, these graphs and/or the energy delivery parameters, e.g., power and voltage, are determined using one or more machine learning algorithms such as those detailed above.

Referring to FIG. 8, a robotic surgical system 1000 configured for use in accordance with the present disclosure is shown. Aspects and features of robotic surgical system 1000 not germane to the understanding of the present disclosure are omitted to avoid obscuring the aspects and features of the present disclosure in unnecessary detail.

Robotic surgical system 1000 generally includes a plurality of robot arms 1002, 1003; a control device 1004; and an operating console 1005 coupled with control device 1004. Operating console 1005 may include a display device 1006, which may be set up in particular to display three-dimensional images; and manual input devices 1007, 1008, by means of which a person, e.g., a surgeon, may be able to telemanipulate robot arms 1002, 1003 in a first operating mode. Robotic surgical system 1000 may be configured for use on a patient 1013 lying on a patient table 1012 to be treated in a minimally invasive manner. Robotic surgical system 1000 may further include a database 1014, in particular coupled to control device 1004, in which are stored, for example, pre-operative data from patient 1013 and/or anatomical atlases.

Each of the robot arms 1002, 1003 may include a plurality of members, which are connected through joints, and a mounted device which may be, for example, a surgical tool "ST." The surgical tools "ST" may include, for example, the one or more energy probes 100 (FIG. 1), the fluid delivery device 300 (FIG. 1), an introducer, an endoscope or other visualization device, etc. More specifically, with respect to the devices detailed herein, the user-manipulations, activations and/or actuations are replaced with robotic inputs to enable a robot to provide the desired manipulation(s), activation(s), and/or actuation(s) similarly as detailed above. That is, in robotic implementations, the devices function similarly according to any of the aspects above except that the devices are directly manipulated, activated, and/or actuated by a robot arm 1002, 1003 rather than a human surgeon.

Robot arms 1002, 1003 may be driven by electric drives, e.g., motors, connected to control device 1004. The motors, for example, may be rotational drive motors configured to provide rotational inputs to accomplish a desired task or tasks. Control device 1004, e.g., a computer, may be configured to activate the motors, in particular by means of a computer program, in such a way that robot arms 1002, 1003, and, thus, their mounted surgical tools "ST" execute a desired movement and/or function according to a corresponding input from manual input devices 1007, 1008, respectively. Control device 1004 may also be configured in such a way that it regulates the movement of robot arms 1002, 1003 and/or of the motors.

Control device 1004, more specifically, may control one or more of the motors based on rotation, e.g., controlling to rotational position using a rotational position encoder (or Hall effect sensors or other suitable rotational position detectors) associated with the motor to determine a degree of rotation output from the motor and, thus, the degree of rotational input provided. Alternatively or additionally, control device 1004 may control one or more of the motors based on torque, current, or in any other suitable manner.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

While several configurations of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular configurations. Those skilled in the art will envision other modifications within the scope and spirit of the claims appended hereto.

What is claimed is:

1. A surgical system, comprising:
a surgical generator including at least one energy output stage configured to deliver energy, at least one controller configured to control the energy output by the at least one energy output stage, and sensor circuitry; and
at least one energy delivery device coupled to the surgical generator, configured for insertion into a synovial joint, and configured to supply energy through synovial fluid in the synovial joint in a sensing mode and a treatment mode,
wherein, in the sensing mode, the sensor circuitry is configured to sense at least one electrical parameter of the supplied energy and the at least one controller is configured to determine a parameter of the synovial fluid based on the at least one electrical parameter, and
wherein the at least one controller is further configured, in the treatment mode, to implement a machine learning algorithm that determines a target region within an overlay plot of an energy delivery parameter versus a parameter of the synovial fluid, and wherein the at least one controller is configured to determine an energy delivery parameter for controlling the energy output by the at least one energy output stage that is within the target region of the overlay plot for the determined parameter of the synovial fluid.

2. The surgical system according to claim 1, wherein the determined parameter of the synovial fluid is a conductivity of the synovial fluid.

3. The surgical system according to claim 2, wherein the at least one controller is configured to determine an impedance of the synovial fluid based on the at least one sensed electrical parameter, and wherein the conductivity is determined based upon the impedance.

4. The surgical system according to claim 1, wherein, in the treatment mode, the at least one output stage of the surgical generator and the at least one energy delivery device are configured to supply pulsed bipolar RF energy to the synovial joint.

5. The surgical system according to claim 1, wherein the at least one energy delivery device includes one energy delivery device having at least one positive electrode and at least one negative electrode.

6. The surgical system according to claim 1, wherein the at least one energy delivery device includes a first energy delivery device having at least one positive electrode and a second energy delivery device having at least one negative electrode.

7. The surgical system according to claim 1, wherein the energy delivery parameter is one of a power or a voltage of the energy output by the at least one output stage based upon the determined parameter.

8. A surgical system, comprising:
a surgical generator including at least one energy output stage configured to deliver energy, at least one controller configured to control the energy output by the at least one energy output stage, and sensor circuitry;
at least one energy delivery device coupled to the surgical generator, configured for insertion into a synovial joint, and configured to supply energy through synovial fluid in the synovial joint; and
a fluid delivery device configured for insertion into the synovial joint and configured to deliver a fluid thereto,
wherein, in a sensing mode, the sensor circuitry is configured to sense at least one electrical parameter of the supplied energy and the at least one controller is configured to:
determine a parameter of the synovial fluid based on the at least one electrical parameter, and
determine at least one of an amount or a conductivity of the fluid to be delivered to the synovial joint via the fluid delivery device based upon the determined parameter of the synovial fluid in order to alter the parameter of the synovial fluid to a target parameter of the synovial fluid, and
wherein, in a treatment mode, the at least one controller is configured to:
implement a machine learning algorithm that determines a target region within an overlay plot of an energy delivery parameter versus a parameter of the synovial fluid, and
determine an energy delivery parameter for controlling the energy output by the at least one energy output stage that is within the target region of the overlay plot for the target parameter of the synovial fluid.

9. The surgical system according to claim 8, wherein the surgical generator further includes at least one pump configured to pump the determined fluid through the fluid delivery device and into the synovial joint.

10. The surgical system according to claim 9, wherein the surgical generator is configured to selectively pump fluid from at least two different fluid sources to achieve a fluid mixture to be delivered as the determined fluid.

11. The surgical system according to claim 8, wherein the at least one determined parameter of the synovial fluid is a conductivity of the synovial fluid, and wherein the determined fluid alters a conductivity of the synovial fluid.

12. The surgical system according to claim 11, wherein the controller is configured to determine an impedance of the synovial fluid based on the at least one sensed electrical parameter, and wherein the conductivity is determined based upon the impedance.

13. The surgical system according to claim 8, wherein, in the treatment mode, the at least one output stage of the surgical generator and the at least one energy delivery device are configured to supply pulsed bipolar RF energy to the synovial joint to treat tissue of the synovial joint.

14. The surgical system according to claim 8, wherein the at least one energy delivery device includes one of: a single energy delivery device having at least one positive electrode and at least one negative electrode or first and second energy delivery device including at least one positive electrode and at least one negative electrode, respectively.

* * * * *